United States Patent [19]

Nelson et al.

[11] Patent Number: 5,432,334
[45] Date of Patent: Jul. 11, 1995

[54] METHOD AND APPARATUS FOR IMAGING MULTIPLE RADIATION BEAMS

[75] Inventors: Steven E. Nelson, Mountain View; Robert A. Street, Palo Alto, both of Calif.

[73] Assignee: Xerox Corporation, Stamford, Conn.

[21] Appl. No.: 221,331

[22] Filed: Mar. 31, 1994

Related U.S. Application Data

[62] Division of Ser. No. 981,691, Nov. 25, 1992.

[51] Int. Cl.$^6$ ............................................. G01J 3/38
[52] U.S. Cl. ................................ 250/208.1; 250/226; 250/370.08; 356/328
[58] Field of Search ................ 250/208.1, 226, 370.08; 356/326, 328

[56] References Cited

U.S. PATENT DOCUMENTS

| | | | |
|---|---|---|---|
| 4,330,209 | 5/1982 | Hashimoto et al. | 356/328 |
| 4,345,158 | 8/1982 | Pfeiler et al. | 378/5 |
| 4,511,799 | 4/1985 | Bjorkholm . | |
| 4,517,733 | 5/1985 | Hamano | 29/572 |
| 4,820,048 | 4/1989 | Barnard | 356/328 |
| 4,945,242 | 7/1990 | Berger et al. | 250/367 |
| 5,037,201 | 8/1991 | Smith, III et al. | 356/326 |
| 5,144,374 | 9/1992 | Grego | 356/326 |
| 5,303,027 | 4/1994 | Kuderer et al. | 356/328 |

FOREIGN PATENT DOCUMENTS

| | | |
|---|---|---|
| 0272870 | 6/1988 | European Pat. Off. . |
| 0303940 | 2/1989 | European Pat. Off. . |
| 0333533 | 9/1989 | European Pat. Off. . |
| 0384708 | 8/1990 | European Pat. Off. . |
| 1196550 | 8/1989 | Japan . |

OTHER PUBLICATIONS

"Real Time K-Edge Substraction X-ray Imaging", Fukagawa et al., *Review of Scienftific Instruments*, 60(7), Jul. 1989, pp. 2268–2271.

"Imaging System With An Amorphous Silicon Linear Sensor", Hasegawa et al., *Review of Scientific Instruments*, 60(7), Jul. 1989, pp. 2284–2286.

"Animal Experiments by K-Edge Subtraction Angiography By Using SR(Abstract)", Anno et al., *Review of Scientific Instruments*, 60(7), Jul. 1989, p. 2230.

"High-Speed Image-Acquisition System For Energy Subtraction Angiography", Nishimura et al., *Review of Scientific Instruments*, 60(7), Jul. 1989, pp. 290–2293.

"A-Cine K-edge Subtraction Angiographic System For Animal Studies", Ueda et al., *Review of Scientific Instruments*, 60(7), Jul. 1989, pp. 2272–2275.

"High-Purity Silicon Radiation-Sensor Array For Imaging Synchrotron Radiation In Digital-Subtraction Angiography Procedures", Audet, *Review of Scientific Instruments*, 60(7), Jul. 1989, pp. 2276–2279.

"NIKOS II–System For Noninvasive Coronary Angiography With Synchrotron Radiation (Abstract)", Graeff et al., *Review of Scientific Instruments*, 60(7), Jul. 1989, p. 2328.

(List continued on next page.)

*Primary Examiner*—Stephone B. Allen
*Attorney, Agent, or Firm*—Oliff & Berridge

[57] ABSTRACT

A radiation imaging method and system for use in various imaging techniques includes a source of radiation at first and second wavelengths. A first radiation target array receives the radiation from the first wavelength at first spacial locations to produce an array of output signals at locations within the first radiation target array related to the magnitude of the radiation at each of the first spacial locations. A second radiation target array receives the radiation at the second wavelength at second spacial locations to produce an array of output signals at locations within the second radiation target array related to the magnitude of the radiation at each of the second spacial locations. The first and second outputs are combined to produce combined image signals that has increased contrast from that which would be produced by either the first or the second output alone. In a preferred embodiment, the first and second radiation target arrays comprise amorphous silicon arrays in which sensor data from the first and second radiation targets is synchronously clocked from the array.

21 Claims, 5 Drawing Sheets

OTHER PUBLICATIONS

"SR High-Speed K-Edge Subtraction Angiography In The Small Animal (Abstract)", Takeda et a., *Review of Scientific Instruments,* 60(7), Jul. 1989, p. 2329.

R. A. Street et al., "Amorphous Silicon Arrays Develop a Medical Image", *IEEE Circuits and Devices, Jul. 1993, pp. 38-42.*

A. C. Thompson, et al., "Transvenous Coronary Angiography Using Synchrotron Radiation", *Nuclear Instruments and Methods in Physics Research,* 1988, pp. 252-259.

X. D. Wu, et al. "Charge-Coupled Devices and Solid State Optical Sensors IV", *SPIE,* vol. 2172, Feb. 7-8, 1994, pp. 144-154.

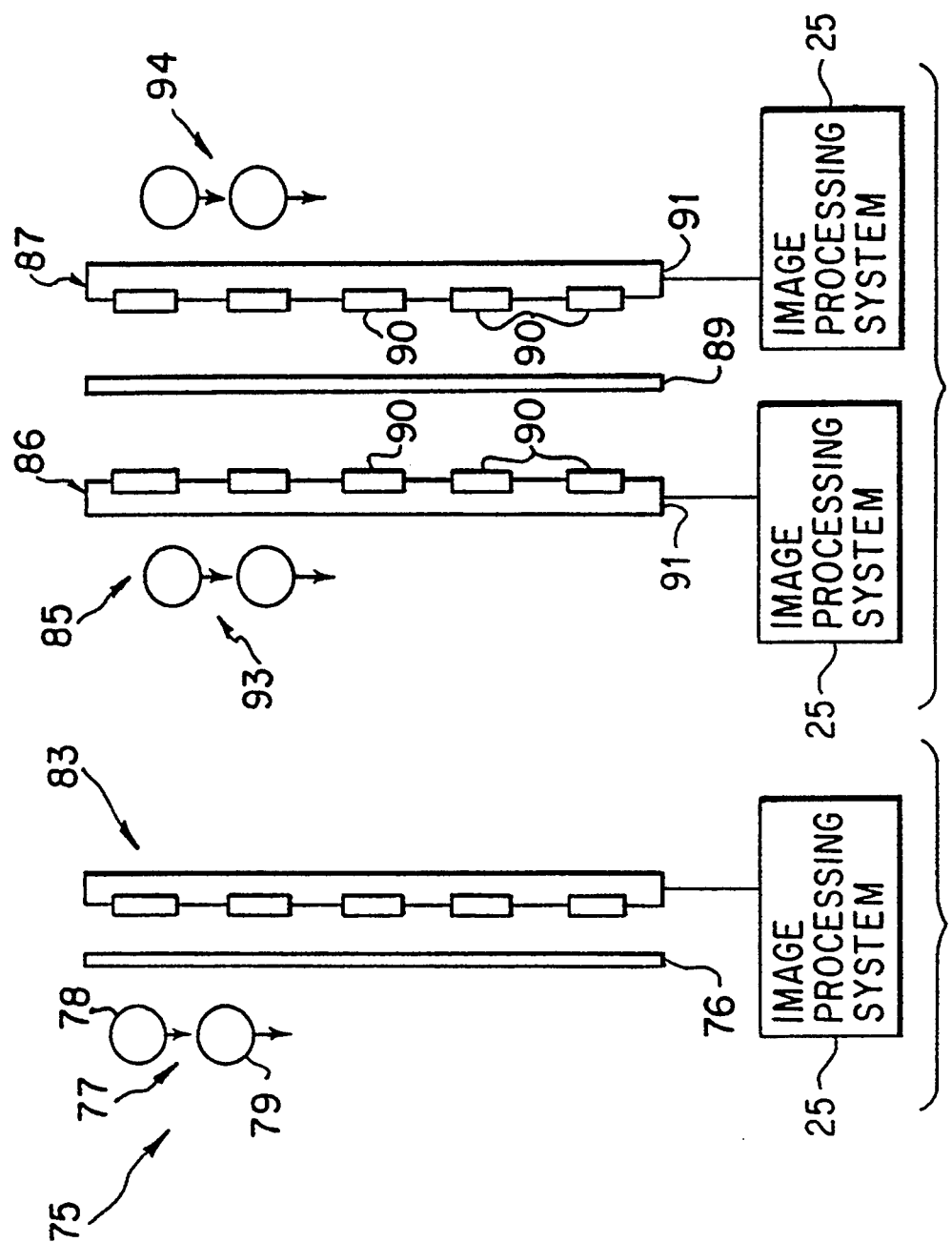

METHOD AND APPARATUS FOR IMAGING MULTIPLE RADIATION BEAMS

This is a Division of application Ser. No. 07/981,691, filed Nov. 25, 1992.

BACKGROUND OF THE INVENTION

1. Field of the Invention

This invention relates to improvements in imaging methods, apparatuses, and circuits, and more particularly to such improvements using x-ray or light radiation for uses such as in medical or document imaging procedures, or the like.

2. Technical Background

Heart disease is one of the most prevalent and lethal diseases, especially for older people throughout the world. Prospective medical screening of large numbers of people is not now possible.

Recently, efforts have been directed to improving x-ray images, particularly in soft tissue detection environments such as coronary arteriography for prospective screening of coronary occlusive heart disease.

Digital subtraction angiography (DSA) is a medical procedure of increasing importance in the diagnosis and treatment of heart disease. The technique is used to form x-ray images of the arteries and blood vessels of the heart to look for constriction. One problem is that a normal x-ray image does not distinguish blood from other tissue. The DSA technique achieves the separation by adding iodine (or other contrast medium) to the blood, and looking at the difference in x-ray images taken at energies above and below the iodine x-ray absorption edge (the K-edge). This allows selective imaging of the blood, because it is the only part of the body containing the iodine.

One method that is becoming increasingly popular uses synchrotron radiation as the source of the two x-ray beams at the different wavelengths. The slit-shaped beams above and below the K-edge intersect the patient's heart and are detected by a pair of linear sensor arrays on the other side. The patient is then moved across the beam to form a two-dimensional image. This technique is called K-edge subtraction angiography. One of the main difficulties with this technique is that the sensors and electronics must have a large dynamic range and very good linearity.

Proposals, such as that of Fukagawa et al., *Review of Scientific Instruments*, 60 (7) July, 1989, pages 2268–2271, advance schemes that disperse an x-ray beam of single wavelength, and acquire an image of that wavelength at one time. Then, the beam disbursal spectrometer is changed, and an image at another wavelength is acquired. The disbursal of the beam causes low average intensity and a longer exposure time. Also, the time between the first and second exposures, and the time of the two exposures, cause a blurring of the moving arteries.

Hasegawa et al., *Review of Scientific Instruments*, 60 (7) July, 1989, pages 2284–2286 show an imaging system composed of a linear array of amorphous silicon. The array is mechanically scanned across the x-ray beam area to form an image line-by-line. This technique is limited by the mechanical scanning time. The scanning fixture also takes up appreciable space and will grow as scanning speed is increased.

Anno et al., "Animal Experiments By K-edge Subtraction Angiography By Using SR (abstract)", *Review of Scientific Instruments*, 60(7), July, 1989, page 2230, describe animal experiments using a synchrotron radiation DSA unit and the images obtained are subtracted. Anno et al. noted that real time A/D converter and frame buffering memories have not been available, until now.

Nishimura et al., "High-Speed Image-Acquisition System For Energy Subtraction Angiography", *Review of Scientific Instruments*, 60(7), July, 1989, page 2290, disclose a method of rapid and successive acquisition of two dimensional images in a digital processing system that uses a pair of video cameras, a shutter operation, and a beam splitting apparatus, in iodine K-edge subtraction angiography using synchrotron radiation. Through the logarithmic subtraction of the two images, the signals arising from soft tissue and bone are suppressed, enhancing the signals from the iodine contrast medium. The technique employs the two video cameras to capture images within a few milliseconds of the other. The Hoyt incident x-ray is reflected by an asymmetrically cut silicon single crystal. The optical output of the radiation source above the K-edge is received by the first camera, with the second camera closed to light reception. Subsequently, the shutters of the cameras are reversed and the second camera receives the light resulting from the x-rays below the K-edge. In this case, the light to the first camera is closed. The images from the two cameras are then subtracted one from the other. The method by which the images are subtracted is not disclosed.

Fukagawa et al., "Real Time K-edge Subtraction X-ray Imaging", *Review of Scientific Instruments*, 60(7), July, 1989, page 2268, disclose an x-ray K-edge subtraction television system for non-invasive angiography using synchrotron radiation. The image to be detected, including a contrast material, is irradiated by monochromitized dual energy x-ray flux, or alternately, by a high speed monochromator, so that the object is irradiated by the flux above and below the K-edge photon energy of the contrast material. The television cameras receive the respective images above and below the K-edge photon energy, to produce video signals that are processed to display the subtraction images of pairs of successive images in real time. In the system, the photon energy of x-rays is changed synchronously with the television frames. The video signal of each frame is memorized and the difference images of the video signals of pairs of successive images are shown. In the one color camera method, the higher energy x-ray images are picked up as red images and the lower energy ones as blue images with electronic shutters combined with color filters. The images are stored and read out by an analog subtraction circuit to be displayed on a black and white monitor to display the energy subtraction image. In a two camera method, two images are televised with electronic shutters timed so that the exposures for camera A and camera B correspond to the two kinds of x-ray irradiation. Each video signal (one field) is memorized in a memory A and B as image data of higher photon energy and lower one respectively. The image data are read out at the same time and fed to a digital calculation circuit to obtain an image difference signal.

Ueda et al., "A Cine K-edge Subtraction Angiographic System For Animal Studies", *Review of Scientific Instruments*, 60(7), July, 1989, page 2272, show a K-edge subtraction imaging system that utilizes synchrotron radiation and uses a monochromator, an x-ray television camera with a high speed shutter, and a data acquisition and control unit. Dual energy images are acquired through repetitive sequences to give a series of K-edge subtraction images. The images are subtracted by storing a digitized image in a frame memory, and subtracting the second image from the first using data processing techniques.

Audet, "High-Purity Silicon Radiation-Sensor Array For Imaging Synchrotron Radiation In Digital-Subtraction Angiography Procedures", *Review of Scientific Instruments*, 60(7), July, 1989, page 2276, discloses the use of a high-purity silicon radiation sensor array in digital subtraction angiography procedures using synchrotron radiation. The detector that is disclosed is a high-purity silicon radiation sensor array using a number of XY readout addresses within a DSA experimental instrumentation system.

Graeff et al., "NIKOS II-System For Non-Invasive Coronary Angiography With Synchrotron Radiation (abstract), *Review of Scientific Instruments*, 60(7), July, 1989, page 2328, discuss the subtraction of images with photon energies above and below the Kedge for the suppression of background contrast for amplification of contrast media structure contrast. Disclosed is a system using a beam line bending magnet.

Takeda et al., "SR High Speed K-edge Subtraction Angiography In The Small Animal (abstract)", *Review of Scientific Instruments*, 60(7), July, 1989, page 2320, disclose a K-edge energy subtraction system for animal experiments. The subtraction system consisted of moveable silicon <111> monocrystals and a digital memory system. Photon energy above and below the K-edge sequentially obtained were subtracted to produce very sharp arterial images.

In a different, but related field, current multiple color document scanning systems of high performance use line scan imaging devices to successively image one line of a document in multiple colors. There are multiple color lamps, and the line imager mechanically sits and waits as an exposure and the readout are made with each of the color lamps. The line imager then mechanically scans to the next line in the document. This is basically the same problem as at x-ray wavelengths. It is desirable to make scans of an image, in several colors, as rapidly as possible.

SUMMARY OF THE INVENTION

In light of the above, it is, therefore, an object of the invention to provide an improved apparatus and method for producing an improved image of an object illuminated by multiple radiation beams.

It is another object of the invention to provide an improved method and apparatus for using multiple radiation beams of x-ray or light radiation in medical or document imaging procedures, or the like.

It is another object of the invention to provide an improved method and apparatus for use in x-ray digital subtraction angiography.

It is another object of the invention to provide an improved method and apparatus for producing a color image of a single or double sided document, slide, transparency, or the like.

It is another object of the invention to provide a method and apparatus for performing double beam subtraction that reduces the linearity and dynamic range requirements of readout electronics.

These and other objects, features and advantages will become apparent to those skilled in the art from the following detailed description, when read in conjunction with the appended claims.

Thus, in accordance with a broad aspect of the invention, a radiation imaging system is provided. The system includes a first source of radiation at a first wavelength and a second source of radiation at a second wavelength, and possibly further sources of radiation at other wavelengths. One or more radiation detector arrays are provided with the object of detecting and combining the images obtained from the sources of radiation at the different wavelengths. In the preferred embodiment, the detector devices are amorphous silicon sensor arrays. These contain rows of pixels that can be read out one line at a time. Each image is in the form of a line scan passing over the sensor array. Visible images are sensed directly, while x-ray images are sensed by using a phosphor converter to transform the x-ray energy to visible light.

In a first embodiment of the invention, the imaging device is a 2-dimensional sensor array. The two line scan beams from the first and second sources of radiation are oriented with the rows of pixels and spatially separated as they pass over the array. The proposed imaging technique, referred to as a "wavelength domain scanned imaging" technique, is similar to the technique used in Charge Coupled Devices (CCDs) called "time domain imaging". In "time domain imaging" an image is scanned across a Charge Coupled Device and the line shift and readout of the area CCD are synchronized with the rate of image motion. Increases of sensitivity and uniformity result from the process. In "wavelength domain scanned imaging" beams of different wavelengths (color or energy) are simultaneously scanned across an area detector, and the line readouts are synchronized to provide images at the different wavelengths.

Means are provided for combining the first and second spatial outputs to produce combined image signals. In the case of x-ray DSA imaging an indicator material that has a first transparency to radiation at the first wavelength and a second transparency to radiation at the second wavelength is introduced at selected locations within an object between the first and second source of radiation and the radiation detector arrays. Subtraction of the first and second image signal provides an image of the indicator material with increased contrast from that which would be produced by either the first or the second output alone. In the case of color document imaging, the sources of radiation can be red, green and blue light beams. These illuminate a document placed in contact with the image sensor array. The line readouts are synchronized to provide the images at the different wavelengths. The individual images are appropriately combined to give a full color image.

A second embodiment of the invention utilizes an array structure that directly gives a difference signal between the two images, and is particularly applicable to x-ray DSA imaging. The pixels in one row of the sensor array contain pairs of sensors that are spatially separated and connected to a common output. One group of sensors is located to receive the radiation from the first source of radiation at first spacial locations to produce signal charge related to the magnitude of the radiation at each of the first spacial locations. The second group of sensors is aligned to receive the radiation from the second source of radiation at second spacial locations to produce signal charge of the opposite polarity related to the magnitude of the radiation at each of the second spacial locations. The output signal is the difference in the density of the first and second radiation beams. The subtraction of the two images is therefore performed before the readout. Consequently, lower performance readout electronics are sufficient, yielding a device that is easier and less expensive to make.

Thus, depending upon the type of radiation source, the radiation imaging system can be used to produce images of various different types of images, such as a document images, or of an indicator material such as iodine in regions to be imaged through the use of x-rays.

In another broad aspect of the invention, a method is presented in which an object containing an indicator material that has a first transparency to radiation at a first wavelength and a second transparency to radiation at second wavelength is irradiated with radiation at the first and second wavelengths. First and second spatial arrays of visible light signals related to the magnitude of the radiation respectively of the first and second wavelengths passing the object at corresponding spacial locations are produced. First and second arrays of electronic signals from the first and second spatial arrays of visible light signals are produced, and the first and second arrays of electronic signals to produce a combined image signal are combined. The combined image signal providing an image of the indicator material with increased contrast from that which would be produced by either the first or the second electronic signal alone.

BRIEF DESCRIPTION OF THE DRAWING

The invention is illustrated in the accompanying drawings, in which:

FIG. 5 is a side elevation diagrammatically depicting apparatus for producing an image of a single sided paper document or transparency, slide, or the like.

FIG. 6 is a side elevation diagrammatically depicting apparatus for producing an image of a double sided paper document, or the like.

DETAILED DESCRIPTION OF THE PREFERRED EMBODIMENTS

Figure 1:
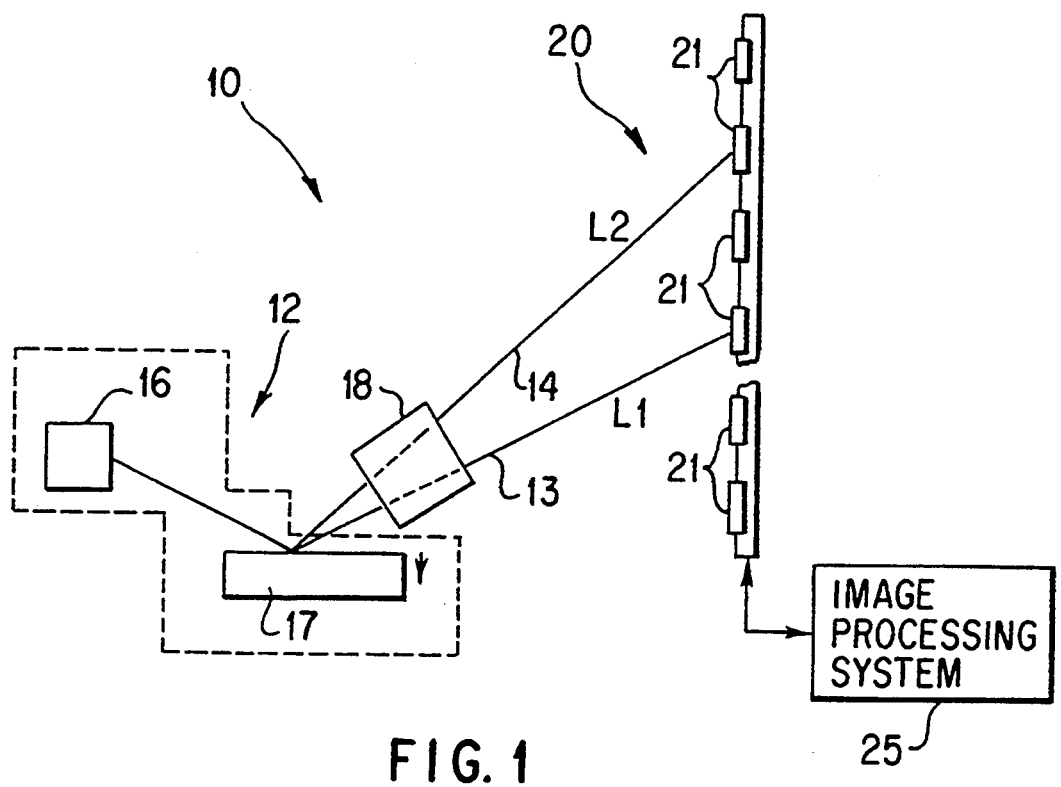
FIG. 1 is a side view showing an x-ray imaging system, in accordance with a preferred embodiment of the invention.

With reference to FIG. 1, an imaging apparatus 10 includes a beam generator 12 that produces two wide, thin x-ray beams 13 and 14 at two different wavelengths, L1 and L2, to enable a rapid exposure and readout of the x-ray images. Beams of longer, shorter, and intermediate wavelengths may also be produced, but the "wavelength domain scanned imaging" (WDSI) readout system 10 of the invention can be designed to collect data only on the wavelength ranges of interest. A preferred embodiment for such a beam generator 12 is a high brightness x-ray beam generator, such as a synchrotron source 16, or the like, to produce a beam that is disbursed by a rotating crystal spectrometer 17. Alternatively, two separate beam sources (not shown) can be employed to generate the two beams, with appropriate beam timing arrangements.

Figure 2:
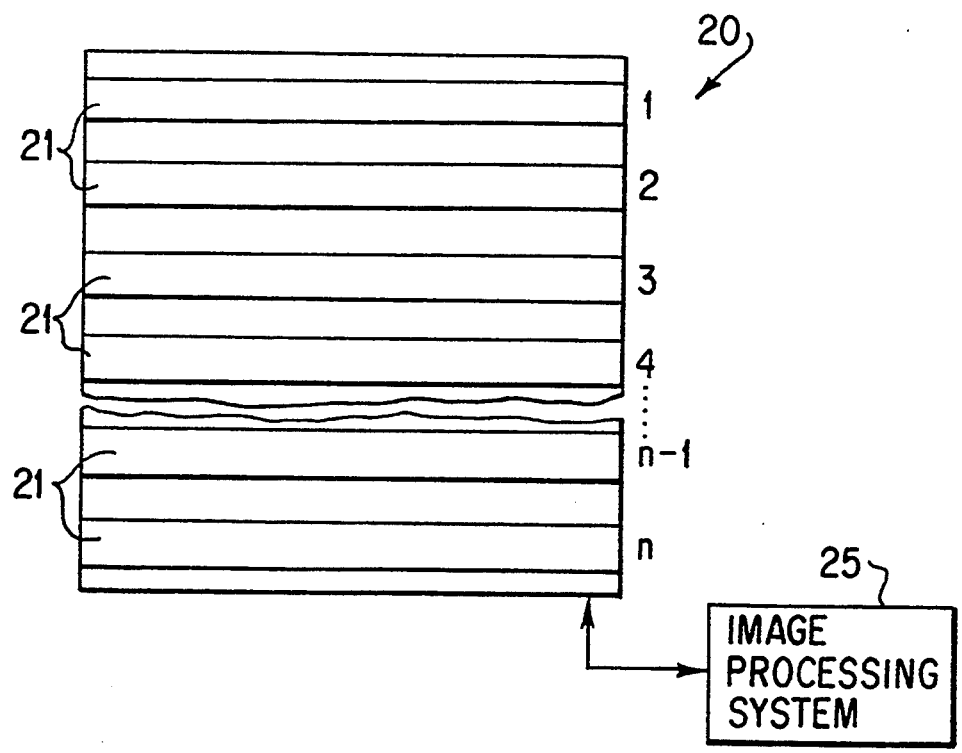
FIG. 2 is a plan view of the detector array used in the x-ray imaging system of FIG. 1.

The output from the beam generator 12 is rapidly scanned across an area imaging detector system 20. The area imaging detector system 20 is made up of independent line readouts 21, numbered for convenience from line 1 to line n (see FIG. 2). The object 18 that is to be imaged can therefore be located between the beam generator 12 and the imaging detector system 20. More particularly, the object 18 from which the image is to be made is partially transparent to the scanning x-ray beams 13 and 14, and is placed in front of the detector 20 and imaged in transmission into the detector 20. Preferably, the object 18 contains an indicator medium (not shown) that has a first transparency to radiation at the first wavelength and a second transparency to radiation at the second wavelength.

The detector 20 may be an amorphous silicon 2-dimensional sensor array that can be formed in a manner described by R. A. Street et al., "Amorphous silicon sensor arrays for radiation imaging", *Material Research Society Symposium Proceedings*, Vol. 192, pp. 441–452, 1990, said publication also being incorporated herein by reference.

Figure 3:
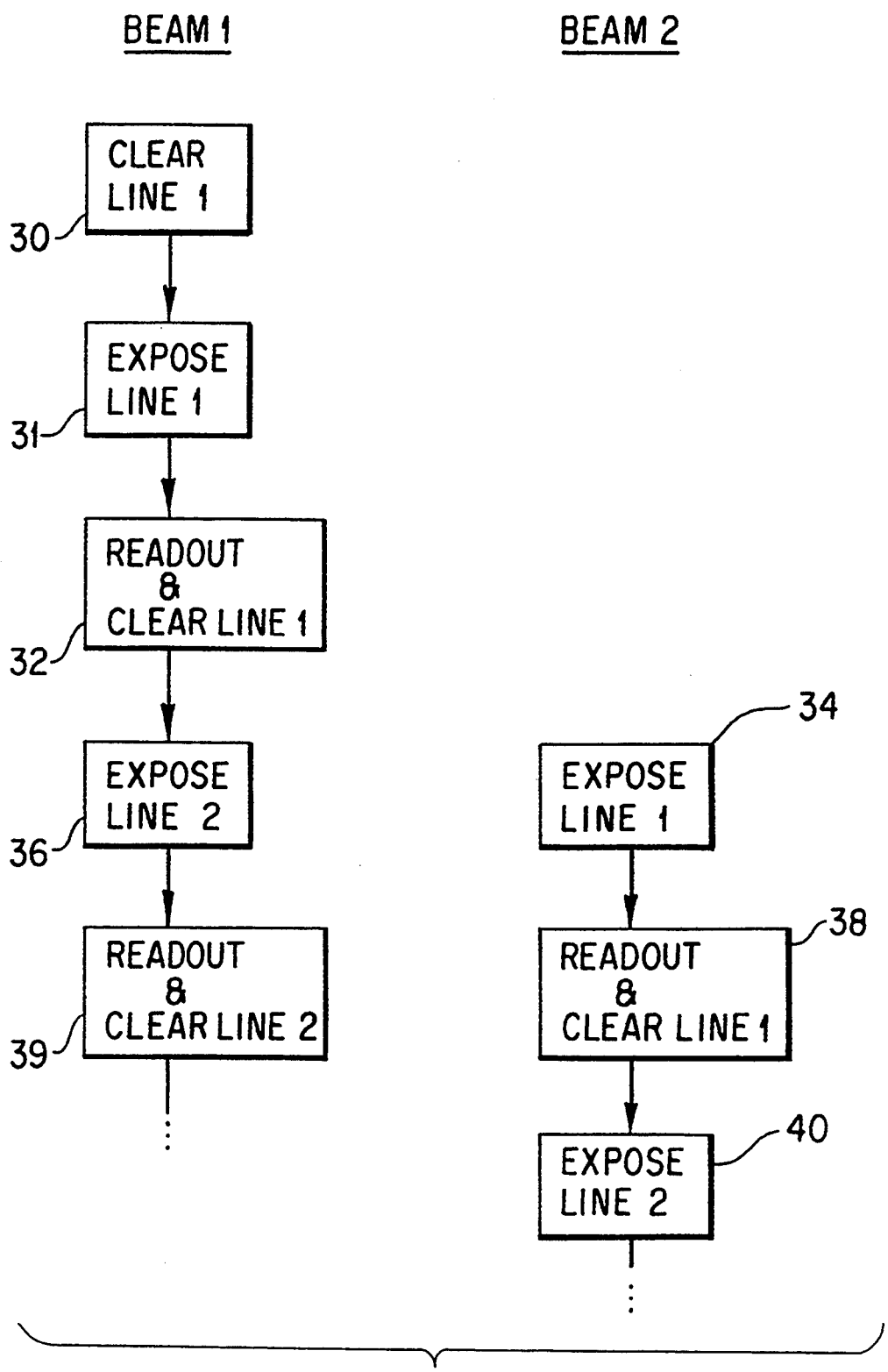
FIG. 3 is a box diagram showing the steps in the method of operation of the system of FIG. 1.

The operation of the WDSI system 10 is explained in greater detail with additional reference now to FIG. 3, to coordinate multiple interlaced line readouts with the scanning of the different wavelength beams 13 and 14. For the two wavelength x-ray embodiment illustrated, the scan starts at line 1 at the top of the detector 20. Before being exposed by the beam 13 of wavelength L1, the line 1 is cleared 30. If desired, the background may also be read. The beam 13 of wavelength L1 is then scanned 31 across line 1 to expose it. The beam 13 may then be scanned down to the next line, line 2.

After line 1 has been exposed by the beam 13, it is read out 32 into an image processing system 25 and cleared. The scanning and line readout of the first beam 13 continues in this manner until the entire array is exposed.

Concurrently, as the first beam 13 is exposing the selected subsequent lines of the array, concurrent operation of the second beam 14 is begun. Thus, after each of the lines 21 have been exposed by the first beam 13 and readout, they can be immediately exposed by the second beam 14 of wavelength L2 and readout into the image processing system 25. More particularly, after line 1 has been exposed 31, readout and cleared 32, line 1 is exposed 34 by the second beam 14. At substantially the same time, line 2 is exposed 36 by the first beam 13. The exposure of line 1 by the second beam 14 is then readout 38 into the image processing system 25 while the exposure of line 2 by the first beam 13 is readout 39 into the image processing system 25. Then line 3 is exposed by beam 13, while line 2 is exposed 40 by beam 14, and so forth.

It will be appreciated that since the beams 13 and 14 are concurrently exposing respective lines of the detector 20, the time between the exposure of each line by the first beam 13 and to the exposure of the preceding line by the second beam 14 is only a small fraction of the total exposure time for the entire detector 20.

Considerable flexibility is possible in the timing of the readout. All that is required is that all lines of the array are cleared before the first beam passes. Each line must then be read once before the second beam passes and again after the second beam passes.

Subtraction of the two beams that are detected is done after the image is acquired. Moreover, the x-ray intensities of two beams are nearly equal, the difference being on the order of one percent or less of the incident energy. Thus, a requirement that subtracted image typically needs 256-1024 levels of contrast for adequate imaging requires that each detector and the electronics needs a dynamic range of typically 64,000-256,000.

Additionally, if desired, reference sensors can be provided for a "double beam subtraction" on the sensor array 20 along with the associated electronics to accomplish the subtraction for each pixel before readout. This is in distinction to the method of taking signals from the device and performing subtractions subsequently. This technique greatly reduces the linearity and dynamic range requirements of readout electronics. A much lower performance of electronics is sufficient if the subtraction is done by the sensors before readout, because then the electronics only records the subtracted signal.

Figure 7:
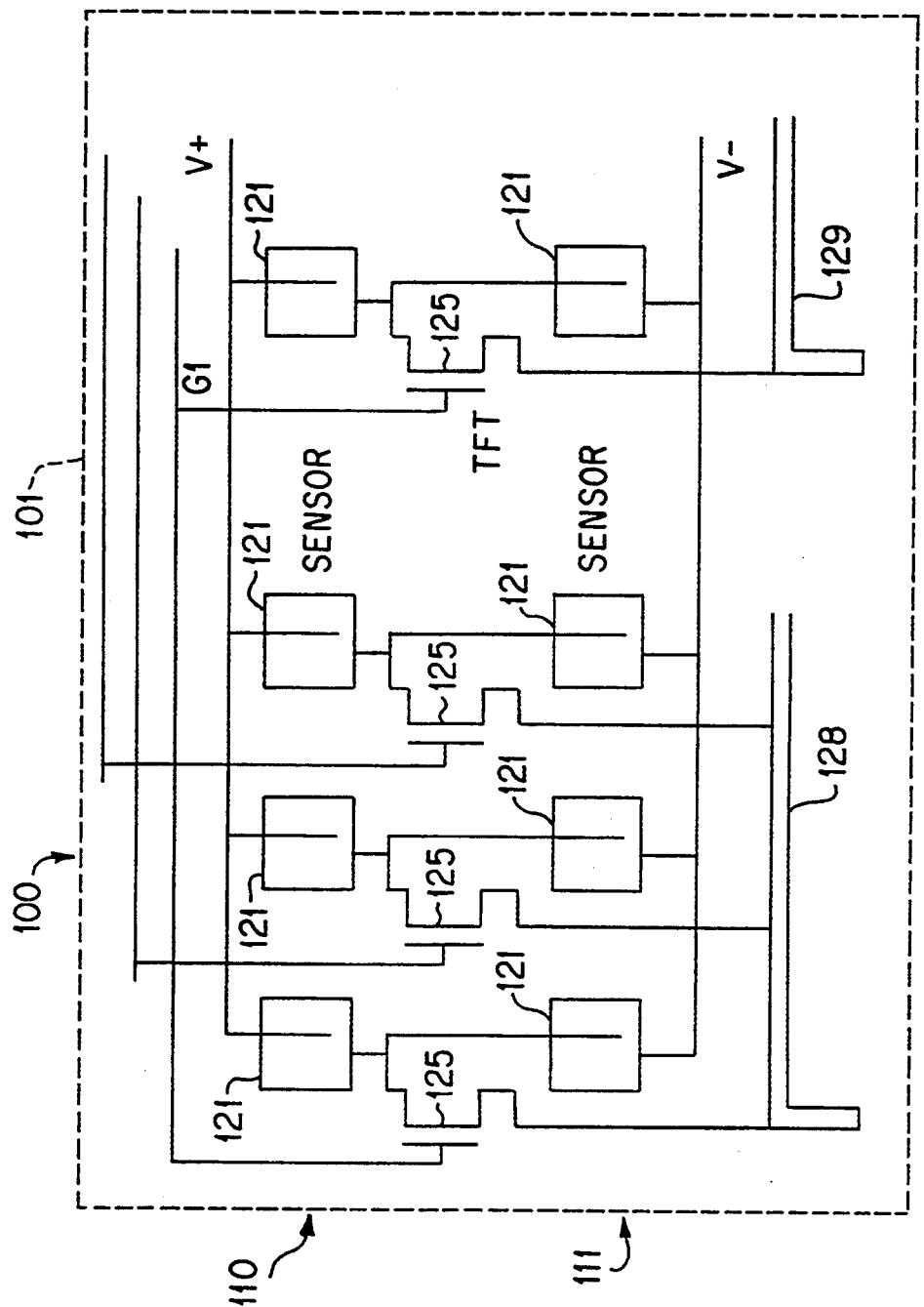
FIG. 7 is an electrical schematic diagram of a portion of a sensor array in accordance with a preferred embodiment of the invention in which charges of two sensors are combined prior to read out to produce a net charge read out, enabling reduced performance requirements of the associated electronics.

Thus, in accordance with a second preferred embodiment of the invention, a sensor structure 100 using amorphous silicon is provided, the details of a portion of which are shown in FIG. 7. The sensor structure 100 can be formed on a single silicon substrate, denoted by the dotted line 101. The sensor structure 100 has two rows 110 and 111 of identical sensors 121 separated by the distance required by the x-ray beams. Although only two rows are shown in the drawing, it will be appreciated that several rows can be employed, as needed. The size of the sensors is determined by the resolution requirements of the particular application for which the array is being used. A bias voltage (not shown) of $+V$ and $-V$ is applied to the top of the sensors on the top row 110 and the bottom of the sensors on the bottom row 111. The other contacts to the sensors join at the respective source contacts of thin film transistor 125. The gate and drain contacts of the transistors 125 are connected as a matrix array, as is used in other amorphous silicon devices. A phosphor (not shown) may be placed over the sensors to convert the x-rays to visible light.

The sensors 121 in each column are identical in structure and bias voltage and are deposited simultaneously, and therefore have essentially identical response for assuring accuracy. The sensors of the top and bottom rows 110 and 111 are essentially the same, differing only in their arrangement of their connectors. When equally illuminated, the charge collected by the two sensors in a column cancels and does not change the bias on the source contact of the associated thin film transistor, so that no signal is read out. Different illumination intensities result in a net charge collection that is the difference in the charge on the two sensors, and is the quantity read out by the electronics.

Typical operating conditions for the amorphous silicon array 100 involve 0.5 mm pixels, with an incident flux of 4 times $10^6$ photons/pixel/acquisition at 33 kev. These parameters give an estimated $10^{-10}$ Coulombs of charge, assuming typical phosphor conversion efficiencies. The maximum subtracted signal is of the order of $10^{-12}$ Coulombs (i.e., 1%). This is similar to the signal obtained in the amorphous silicon optical scanner, and, therefore, is readily detectible.

The layout of the addressing scheme of the array of FIG. 7 is arranged so that the data lines 128 and 129 do not cross thereby reducing the capacity of coupling between the data lines. The sensors 121 are preferably staggered to compensate for any motion of the object during scanning. The sensors 121, however, can be configured in virtually any pattern depending on the particular application to which they are put.

Figure 4:
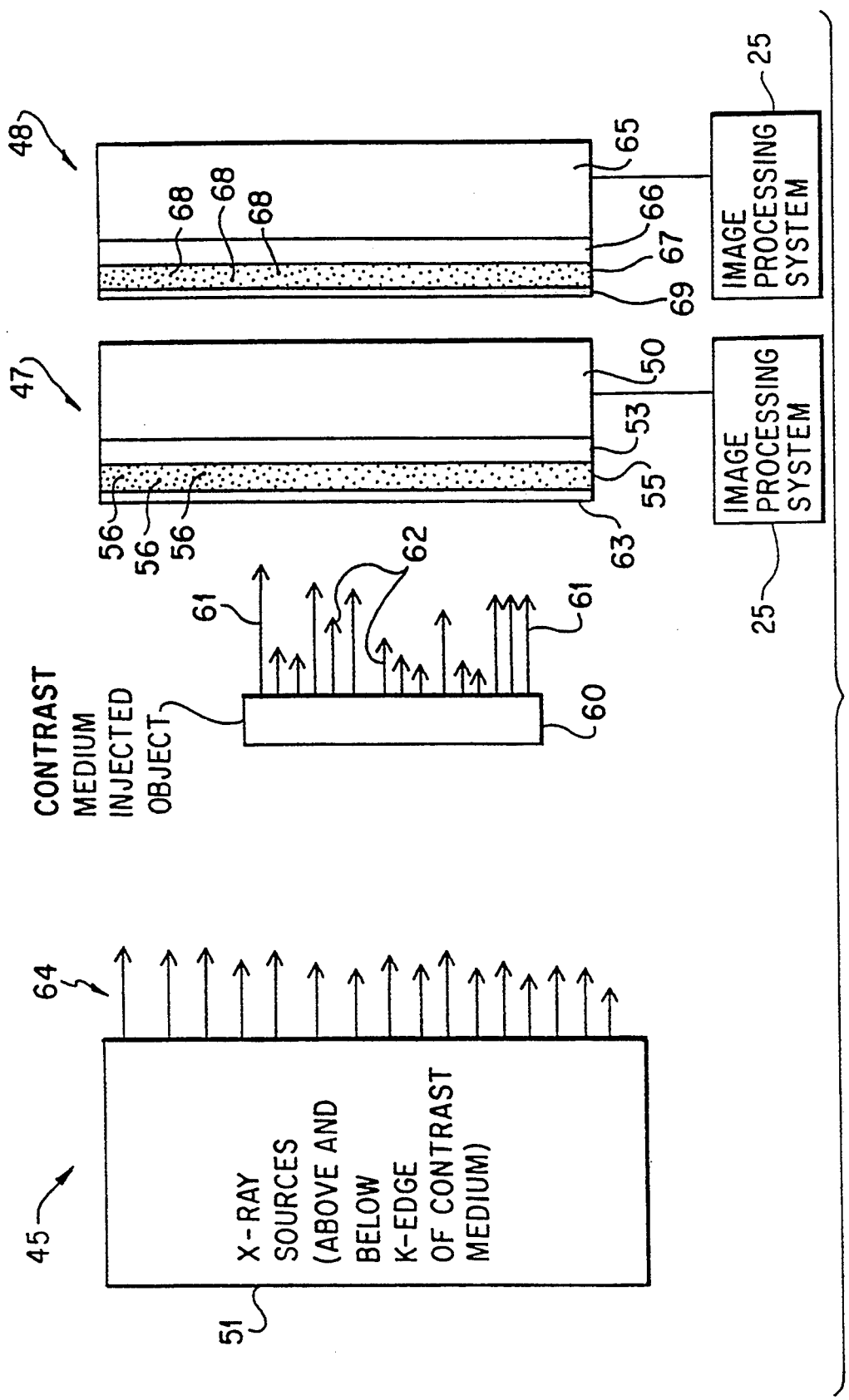
FIG. 4 is a side elevation of apparatus diagrammatically showing a system for producing x-ray images of an object using two x-ray detectors that use light emitting phosphors and amorphous silicon detector arrays.

Another preferred embodiment of an x-ray area detector apparatus 45 for detecting two x-ray energy levels (or, alternatively two "colors" in the document imaging embodiments described below) is shown in FIG. 4. By virtue of the provision of two energy level detection capabilities, a real time K-edge or L-edge subtraction x-ray image can be developed.

The structure of the image detecting apparatus 45 includes two similarly constructed image elements 47 and 48. The image element 47 is formed on a glass substrate 50 and includes an amorphous silicon detector array 53 formed onto the glass substrate 50 on the side that receives the incident radiation, such as the x-ray flux 64 from the x-ray source 51. The x-ray source 51 delivers at least two energy levels of x-ray radiation, for example, one above the K-edge (or L-edge) of the indicator medium contained in the object to be imaged.

A phosphor 56 is placed over the detector 53. The phosphor can be entrained in a polyimide layer 55, and is chosen to be particularly sensitive to high energy radiation above the K-edge of the indicator medium. For example, the phosphor, CsI:Tl is well suitable when the indicator is iodine.

Thus, an x-ray pattern of the entire image of the object 60 is detected on the detector 53. That is, x-rays selectively of higher energy 61 are partially absorbed by regions of contrast material, such as iodine, within the object 60, and impinge upon the phosphor 56 that emits light to be detected on the amorphous silicon detector layer 53.

If desired, additionally, a thin layer of aluminum 63 can optionally be provided on the front face of the detector 47 to reflect the light emitted by the phosphors 56 in the direction of the x-ray source 51, to be reflected back onto the amorphous silicon detector array 53, preventing its escape from the polyimide layer 55 in an undesired direction.

The relative thicknesses of the respective layers of the detector element 47 can be varied also depending on the application in which the detector is used. Typically, for example, the glass substrate 50 may be of depth of about one millimeter, the amorphous silicon detector array 53 of depth of about one micron, and the depth of the phosphor layer 56 can be 20-200 microns.

As mentioned, the low energy detector element 48 is similarly constructed to that of the high energy image detector 47. Accordingly, the low energy detector element 48 is fabricated on a second glass substrate 65 and includes a second amorphous silicon detector array 66.

A different phosphor 68 is placed over detector array 66. The phosphor 68 can be entrained in a polyimide layer 69, and is of such sensitivity as to fluoresce when excited by low energy x-rays that pass the high energy detector element 47, but less sensitive to high energy x-rays that may pass the high energy detector 47. Thus the x-ray image formed in detector 48 is selectively from the low energy x-rays that are less absorbed by the indicator material in the object 60.

The dimensions of the various layers of the low energy image detector 48 can be similarly sized to the respective layers in the high energy image detector 47.

It will be appreciated that the system described above provides a high quantum efficiency assured by the close coupling of the phosphors 56 and 68 and the high efficiency amorphous silicon light detector arrays 53 and 66. Both the high and low image detectors 47 and 48 can be read out in tandem, and the image of the indicator material is formed by appropriate combination of the two images.

Another preferred embodiment of the invention is shown in FIG. 5, in which an apparatus 75 for producing images of color documents is shown. The document 76 that is imaged in the embodiment shown can be a single sided paper document or transparency, slide, or the like. In the embodiment shown, a beam generator 77 has two different wavelength tube lamps 78 and 79. The tube lamps 78 and 79 can be of well known type, such as, for example, those used in flat-bed color CCD line scanners. A third tube lamp, normally required to obtain a full color image can be added. The three lamp version will operate in the same manner as the two lamp version described here.

The tubes 78 and 79 are moved relative to the document 76 and the imager 83. Scanning is accomplished by moving the lamps 78 and 79 to allow light therefrom to pass the document 76 to fall upon the detector 83, for instance with the marked side of the document 76 oriented toward the detector 83.

The operation of the apparatus 75 is similar to that of the x-ray apparatus 10 described above with reference to FIG. 1, except that the respective light sources 78 and 79 provide the detected radiation.

Another embodiment of the invention is shown in FIG. 6, in which an apparatus 85 is provided to produce an image of opaque, highly colored, or two-sided documents. In the embodiment shown, two detectors 86 and 87 are provided on each side of the two-sided document 89 to be imaged. The detectors 86 and 87 are formed with the detector arrays 90 carried upon a transparent substrate 91 to allow light from the light sources 93 and 94 to illuminate the respective faces of the two-sided document 89 between the rows of detectors 90. The advantage of this system is that compact uniform line illumination, simultaneous imaging of two (or many) wavelengths, the perfect registration of images of different wavelengths, and the high sensitivity (or speed) because of the long effective exposure to one line of lamp illumination can be achieved.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A single, addressable, large-area detector producing an image of an object by detecting a plurality of electromagnetic radiation beams, each of the radiation beams being spatially separate on a surface of the detector, each radiation beam having a different wavelength, the detector comprising:

radiation detecting means for detecting each of the radiation beams, the detecting means arranged in a plurality of addressable lines capable of receiving each beam, wherein during a scanning interval, one addressable line separately receives a corresponding one of the plurality of electromagnetic radiation beams after the corresponding radiation beam is modulated by the object, and during a subsequent scanning interval, the one addressable line receives a subsequent one of the plurality of electromagnetic radiation beams after the subsequent radiation beam is modulated by the object; and readout means for reading each addressable line of the radiation detecting means after each scanning interval to determine a magnitude of each radiation beam striking each addressable line during the scanning interval.

2. The detector of claim 1, wherein said radiation detecting means comprises an amorphous silicon array.

3. The detector of claim 2, wherein the amorphous silicon array comprises a rectangular detector array.

4. The detector of claim 1, further comprising comparing means for comparing, for each addressable line, the magnitude of the radiation beams striking the addressable line.

5. The detector of claim 1, wherein a first electromagnetic radiation beam and a second electromagnetic radiation beam are separately radiated towards each addressable line, the detector further comprising subtracting means for subtracting the magnitude of the first electromagnetic radiation beam for a respective addressable line from the magnitude of the second electromagnetic radiation beam for the respective addressable line after the first electromagnetic radiation beam and the second electromagnetic radiation beam have each been received by the respective addressable line.

6. The detector of claim 1, wherein the object is an image on a document.

7. The detector of claim 6, wherein the image is a colored image.

8. A single detector for producing an image of an object using a plurality of electromagnetic radiation beams, each electromagnetic radiation beam having a different wavelength, the detector comprising:

a plurality of addressable lines, wherein each addressable line separately receives each one of the electromagnetic radiation beams after each respective radiation beam is modulated by the object, wherein each of the addressable lines comprises:

a plurality of sensor groups, each sensor group comprising a plurality of sensors, each sensor being sensitive to a different one of the plurality of wavelengths; and combining means for combining an output of each of the sensors of each sensor group.

9. The detector of claim 8, wherein the combining means comprises a plurality of transistors, each one of the transistors connected to receive the output of each sensor of one of the plurality of sensor groups.

10. The detector of claim 9, wherein each sensor of each sensor group is biased by one of a positive voltage and a negative voltage, a magnitude of the positive voltage being equal to a magnitude of the negative voltage.

11. The detector of claim 10, wherein a first one of the sensors of each sensor group is biased by the positive voltage and is connected to a source of a respective transistor, a second one of the sensors of each sensor group is biased by the negative voltage and is connected to the source of the respective transistor.

12. The detector of claim 8, wherein the plurality of addressable lines comprise an amorphous silicon array.

13. The detector of claim 12, wherein the amorphous silicon array comprises a rectangular array of the plurality of the sensor groups.

14. The detector of claim 8, further comprising image means for collecting an output of each of the combining means to produce the image of the object.

15. A method of imaging on a single, addressable, large-area detector using a plurality of electromagnetic radiation beams, the addressable detector arranged in a plurality of addressable lines, each radiation beam separately radiating onto a different one of the plurality of addressable lines of the detector during a scanning interval, each electromagnetic radiation beam having a different wavelength, the method comprising:
  (a) clearing a current addressable line;
  (b) exposing the current addressable line with one of the plurality of radiation beams;
  (c) reading the current addressable line;
  (d) waiting a predetermined interval;
  (e) repeating steps (a) through (d) for each one of the plurality of electromagnetic radiation beams.

16. The method of claim 15, wherein a next addressable line is exposed with a previous one of the electromagnetic radiation beams when the current addressable line is being exposed with a current one of the radiation beams.

17. The method of claim 15, further comprising the step of combining for each addressable line, outputs of the addressable line corresponding to the plurality of electromagnetic radiation beams, to form an image.

18. The method of claim 17, wherein the step of combining the outputs of the plurality of electromagnetic radiation beams comprises, for each addressable line, subtracting the output of a first one of the plurality of radiation beams from the output of a second one of the plurality of radiation beams.

19. The method of claim 15, wherein the plurality of addressable lines comprise an amorphous silicon array.

20. The method of claim 15, wherein said step of exposing the current addressable line comprises irradiating an object with said radiation beam.

21. The method of claim 20, wherein said object contains an indicator fluid.

* * * * *